US012737166B2

(12) United States Patent
Wang et al.

(10) Patent No.: US 12,737,166 B2
(45) Date of Patent: Sep. 15, 2026

(54) LOOP PIPELINING SEMANTICS USING STRUCTURED CONTROL FLOW (SCF) OPERATIONS WITH EXPLICITLY PASSED-IN ASYNCHRONOUS TOKENS

(71) Applicant: XILINX, INC., San Jose, CA (US)

(72) Inventors: Erwei Wang, London (GB); Jeffrey Fifield, Longmont, CO (US); Philip James-Roxby, Longmont, CO (US); Samuel R. Bayliss, Mountain View, CA (US); Zachary Blair, San Jose, CA (US)

(73) Assignee: XILINX, INC., San Jose, CA (US)

( * ) Notice: Subject to any disclaimer, the term of this patent is extended or adjusted under 35 U.S.C. 154(b) by 252 days.

(21) Appl. No.: 18/528,357

(22) Filed: Dec. 4, 2023

(65) Prior Publication Data

US 2025/0181334 A1 Jun. 5, 2025

(51) Int. Cl.
*G06F 8/41* (2018.01)

(52) U.S. Cl.
CPC .................................. *G06F 8/452* (2013.01)

(58) Field of Classification Search
None
See application file for complete search history.

(56) References Cited

U.S. PATENT DOCUMENTS 11,758,393 B1 * 9/2023 Stolbikov ............ H04L 9/3247 713/171
2002/0120923 A1 * 8/2002 Granston ............. G06F 8/4452 717/160
2004/0019883 A1 * 1/2004 Banerjee ................ G06F 8/445 717/150
2004/0088666 A1 * 5/2004 Poznanovic ........... G06F 30/30 716/105
2008/0195847 A1 * 8/2008 Wu ...................... G06F 9/3851 712/216
2009/0077545 A1 * 3/2009 Silvera ................... G06F 8/443 717/160
2011/0088021 A1 * 4/2011 Kruglick .................. G06F 8/45 717/149
2012/0254875 A1 * 10/2012 Marathe .................... G06F 8/72 718/102
2012/0311106 A1 * 12/2012 Morgan ............. G06F 9/45558 709/220
2014/0047422 A1 * 2/2014 Ravi ....................... G06F 8/443 717/151
2015/0106596 A1 * 4/2015 Vorbach ............... G06F 9/3877 712/221
2015/0339256 A1 * 11/2015 Dupont De Dinechin ................. G06F 15/17325 712/29
2016/0048380 A1 * 2/2016 Nakashima ............ G06F 8/443 717/160

(Continued)

*Primary Examiner* — Philip Wang
(74) *Attorney, Agent, or Firm* — Patterson + Sheridan, LLP

(57) ABSTRACT

A method includes a method includes receiving, by a compiler of a host of a computing system, input code, generating, by the compiler, pipelined input code by adding first tokens in a loop iteration argument field of a loop in the input code to pipeline the loop, the first tokens configured to sequentialize and serialize loop operations, a quantity of the first tokens based on a quantity of pipeline stages, and providing, by the host, the pipelined input code to a controller of an integrated circuit (IC) of the computing system.

18 Claims, 8 Drawing Sheets

(56) References Cited

U.S. PATENT DOCUMENTS

| | | | | |
|---|---|---|---|---|
| 2020/0257510 | A1* | 8/2020 | Deodhar | G06F 9/3838 |
| 2021/0224099 | A1* | 7/2021 | Luo | G06F 8/63 |
| 2023/0153086 | A1* | 5/2023 | Ahmed | G06F 8/433 717/143 |
| 2023/0206046 | A1* | 6/2023 | Ma | G06N 3/063 706/15 |
| 2025/0124204 | A1 | 4/2025 | Kulshreshtha et al. | |
| 2025/0190189 | A1* | 6/2025 | Lucia | G06F 8/443 |

* cited by examiner

300A 302, 304, 306, 308

```
%alloc = memAlloc() : memref<128x128xi32>
%alloc_1 = memAlloc() : memref<128x128xi32>
scf.for %arg12 = %c0 to %c256 step %c32 {
  mem_cpy (%alloc, %mem)
  add_one ins(%alloc) outs(%alloc_1)
  mem_cpy (%mem, %alloc_1)
}
memDealloc %alloc
memDealloc %alloc_1
```

```
%async_token, %results = memAlloc() : memref<128x128xi32>
%async_token_1, %results_2 = memAlloc() : memref<128x128xi32>
%3 = air.wait_all async [%async_token, %async_token_1]
%4 = scf.for %arg12 = %c0 to %c256 step %c32 iter_args(%arg13 = %3) ->
(async.token) {
  %5 = mem_cpy async [%arg13] (%results, %mem)
  %async_token_7 = add_one async [%arg13] ins(%results) outs(%results_2)
  %6 = mem_cpy async [%async_token_7] (%mem, %results_2)
  scf.yield %6 : async.token
}
%async_token_3 = memDealloc async [%4] %results
%async_token_4 = memDealloc async [%4] %results_2
```

```
// ping
%async_token, %results = memAlloc() : memref<128x128xi32>
%async_token_1, %results_2 = memAlloc() : memref<128x128xi32>
%ping = air.wait_all async [%async_token, %async_token_1]
// pong
%async_token_2, %results_3 = memAlloc() : memref<128x128xi32>
%async_token_3, %results_4 = memAlloc() : memref<128x128xi32>
%pong = air.wait_all async [%async_token_2, %async_token_3]
%4:4 = scf.for %arg12 = %c0 to %c256 step %c64 iter_args(%arg13 = %ping,
%arg14 = %pong, %arg15 = %pong, %arg16 = %pong) -> (async.token,
async.token, async.token, async.token)
  // ping producer
  %5 = mem_cpy async [%arg13, %arg16] (%results, %mem)
  // ping consumer
  %async_token_7 = add_one async [%5, %arg15] ins(%results)
outs(%results_2)
  %6 = mem_cpy async [%async_token_7] (%mem, %results_2)
  // pong producer
  %7 = mem_cpy async [%arg14, %5] (%results_3, %mem)
  // pong consumer
  %async_token_8 = add_one async [%7, %async_token_7] ins(%results_3)
outs(%results_4)
  %9 = mem_cpy async [%async_token_8] (%mem, %results_4)
  scf.yield %6, %9, %9, %7 : async.token, async.token, async.token,
async.token
}
%async_token_4 = memDealloc async [%4#3] %results
%async_token_5 = memDealloc async [%4#3] %results_2
%async_token_6 = memDealloc async [%4#3] %results_3
%async_token_9 = memDealloc async [%4#3] %results_4
```

LOOP PIPELINING SEMANTICS USING STRUCTURED CONTROL FLOW (SCF) OPERATIONS WITH EXPLICITLY PASSED-IN ASYNCHRONOUS TOKENS

TECHNICAL FIELD

Examples of the present disclosure generally relate to adding pipelining to input code of a program.

BACKGROUND

In order to improve the efficiency of an input code (program), pipelining can be added to input code. Pipelining, also known as a data pipelining, is a set of data processing elements where the output of one processing element serves as an input to a next processing element. Software pipelines consist of a sequence of computing processes such as commands, operations, program runs, or the like, that are computed at least partially in parallel where the output of one operation serves as the input to a next operation. Pipelining reduces the run time of the program. Pipelining includes both sequentiality and serialization between loops in the input code Adding pipelining semantics to input code includes adding data dependencies within the loop body and between iterations. Dependencies within the loop body and between iterations are a way to ensure that data dependencies (i.e., the operations in the pipeline) are satisfied in the correct order. However, due to limited resources, along with complexities in the input code, the required sequentiality of the pipelined process and the serialization between loops make adding pipeline semantics to input code difficult.

SUMMARY

In one or more examples, a method includes receiving, by a compiler of a host of a computing system, input code, generating, by the compiler, pipelined input code by adding first tokens in a loop iteration argument field of a loop in the input code to pipeline the loop, the first tokens configured to sequentialize and serialize loop operations, a quantity of the first tokens based on a quantity of pipeline stages, and providing, by the host, the pipelined input code to a controller of an integrated circuit (IC) of the computing system.

In one or more examples, a compiler includes instructions to receive input code, and generate pipelined input code by adding first tokens in a loop iteration argument field of a loop in the input code to pipeline the loop, the first tokens configured to sequentialize and serialize loop operations, a quantity of the first tokens based on a quantity of pipeline stages.

In one or more examples, an integrated circuit (IC) includes a controller configured to receive pipelined input code from a host including a compiler to receive input code, and generate the pipelined input code by adding first tokens in a loop iteration argument field of a loop in the input code to pipeline the loop, the first tokens configured to sequentialize and serialize loop operations, a quantity of the first tokens based on a quantity of pipeline stages.

BRIEF DESCRIPTION OF DRAWINGS

FIG. 3A illustrates an example input code of a program according to one or more examples.

FIG. 3B illustrates the example input code of FIG. 3A with asynchronous concurrency according to one or more examples.

FIG. 3E illustrates the example input code of FIG. 3B with pipelining according to one or more examples.

DETAILED DESCRIPTION

Pipeline (pipelining semantics) can be added to input code of a program to improve the efficiency of the program. Adding pipelining to a program allows for program operations to be executed at least partially in parallel, and thus, decreases the run time of the program. Pipelining includes both sequentiality and serialization between loops in the input code. Adding pipelining semantics to input code includes adding data dependencies within the loop body and between loop iterations. However, due to limited processing resources, along with complexities in the input code, the sequentiality of the pipelined process and the serialization between loops makes adding pipeline semantics to input code difficult.

Embodiments herein are related to pipelining loops in a program (i.e., input code) by adding loop pipeline semantics to each loop in the program using explicitly passed in asynchronous tokens. In particular, embodiments herein are related to passing asynchronous tokens into and throughout the loop, allowing coordination of multiple iterations of a loop concurrently while ensuring correctness, minimizing overhead and enabling high-granularity schedule control.

Figure 1:
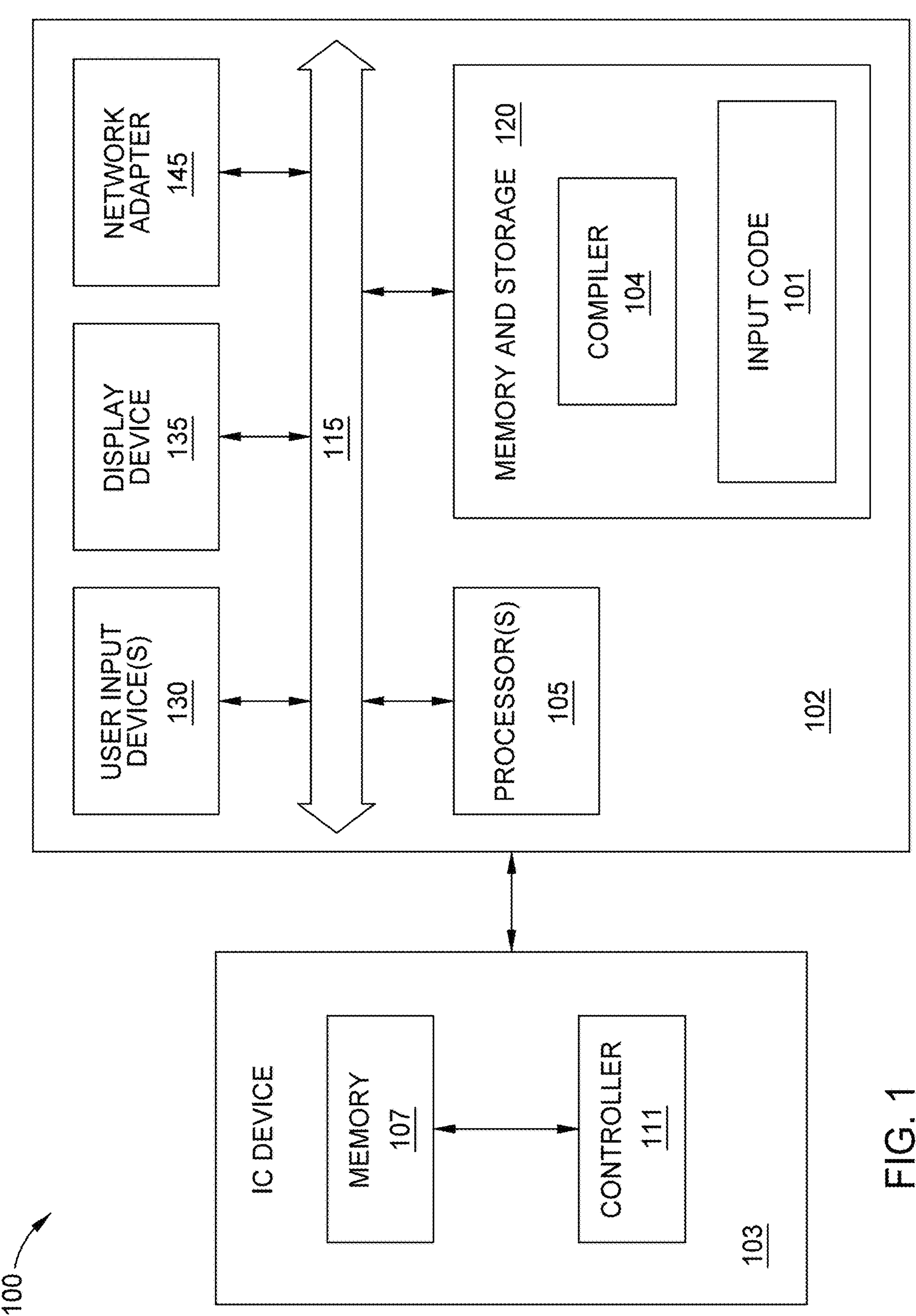
FIG. 1 illustrates a computing system according to one or more examples.

FIG. 1 is a block diagram illustrating an exemplary computing system 100, according to one or more examples. The computing system 100 may include an integrated circuit (IC) device 103 coupled to a host 102. The host 102 is an example of a system configured to implement a compiler 104. In one example, the compiler 104 is configured to utilize any data structure or code, such as code in multi-level intermediate representation (MLIR). For example, the compiler 104 is an MLIR AMD intermediate representation (MLIR-AIR) compiler. As pictured, the IC device 103 is coupled to the host 102. In one example, the IC device 103 includes a controller 111 coupled to a memory 107. In one example, the memory 107 represents one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid-state drive (SSD), or other persistent data storage device. The controller 111 represents one or more processors such as a microprocessor, a central processing unit, or the like. The controller 111 may also be one or more special-purpose processing devices such as an application specific integrated circuit (ASIC), a central processing unit (CPU), a field programmable gate array (FPGA), a digital signal processor (DSP), network processor, or the like. The IC device 103 may be configured to execute a program provided by the host 102. As will be described in more detail below the controller 111 is configured to control and synchronize the operations of the 1C device 103 such that the IC device 103 follows the pipelined schedule of the input code provided by the host 102.

As pictured, the host 102 includes at least one processor circuit 105 (or "processor"), e.g., a central processing unit (CPU), a graphic processing unit (GPU), or any other processing device, coupled to the memory and storage arrangement 120 through a system bus 115 or other suitable circuitry. The host 102 stores input code 101 (i.e., a program) and the compiler 104 within the memory and storage arrangement 120. In one example, the compiler 104 is configured to add pipeline semantics to the program using the steps described herein. In one aspect, the computing system 100 is implemented as a computer or other the data processing system that is suitable for storing and/or executing program code. It should be appreciated, however, that the computing system 100 can be implemented in the form of any system including a host, a processor and a memory that is capable of performing the functions described within this disclosure.

The memory and storage arrangement 120 includes one or more physical memory devices such as, for example, a local memory (not shown) and a persistent storage device (not shown). In one example, the memory and storage arrangement 120 includes the compiler 104. The compiler 104 includes instruction stored within the memory and storage arrangement 120. In one or more examples, the instructions corresponding to the compiler 104 stored in the memory and storage arrangement 120 are executed by the processor 105 to perform the functions of the compiler 104. Local memory refers to random access memory or other non-persistent memory device(s) generally used during actual execution of the program code. Persistent storage can be implemented as a HDD, SSD, or other persistent data storage device. The host 102 may also include one or more cache memories (not shown) that provide temporary storage of at least some program code and data in order to reduce the number of times program code and data must be retrieved from local the memory and persistent storage during execution.

Input/output (I/O) devices such as user input device(s) 130 and a display device 135 may be optionally coupled to the computing system 100. The I/O devices may be coupled to the host 102 either directly or through intervening 1/O controllers. A network adapter 145 also can be coupled to the host 102 in order to couple the host 102 to other systems, computer systems, remote printers, and/or remote storage devices through intervening private or public networks. Modems, cable modems, Ethernet cards, and wireless transceivers are examples of different types of network adapter 145 that can be used with the computing system 100.

The memory and storage arrangement 120 may store a compiler 104. The compiler 104, being implemented in the form of executable program code, is executed by processor(s) 105. As such, the compiler 104 is considered part of the host 102. The host 102, while executing the compiler 104, receives and operates on the input code 101. In one aspect, the host adds pipelining to the input code 101. This will be described in more detail below.

Figure 2:
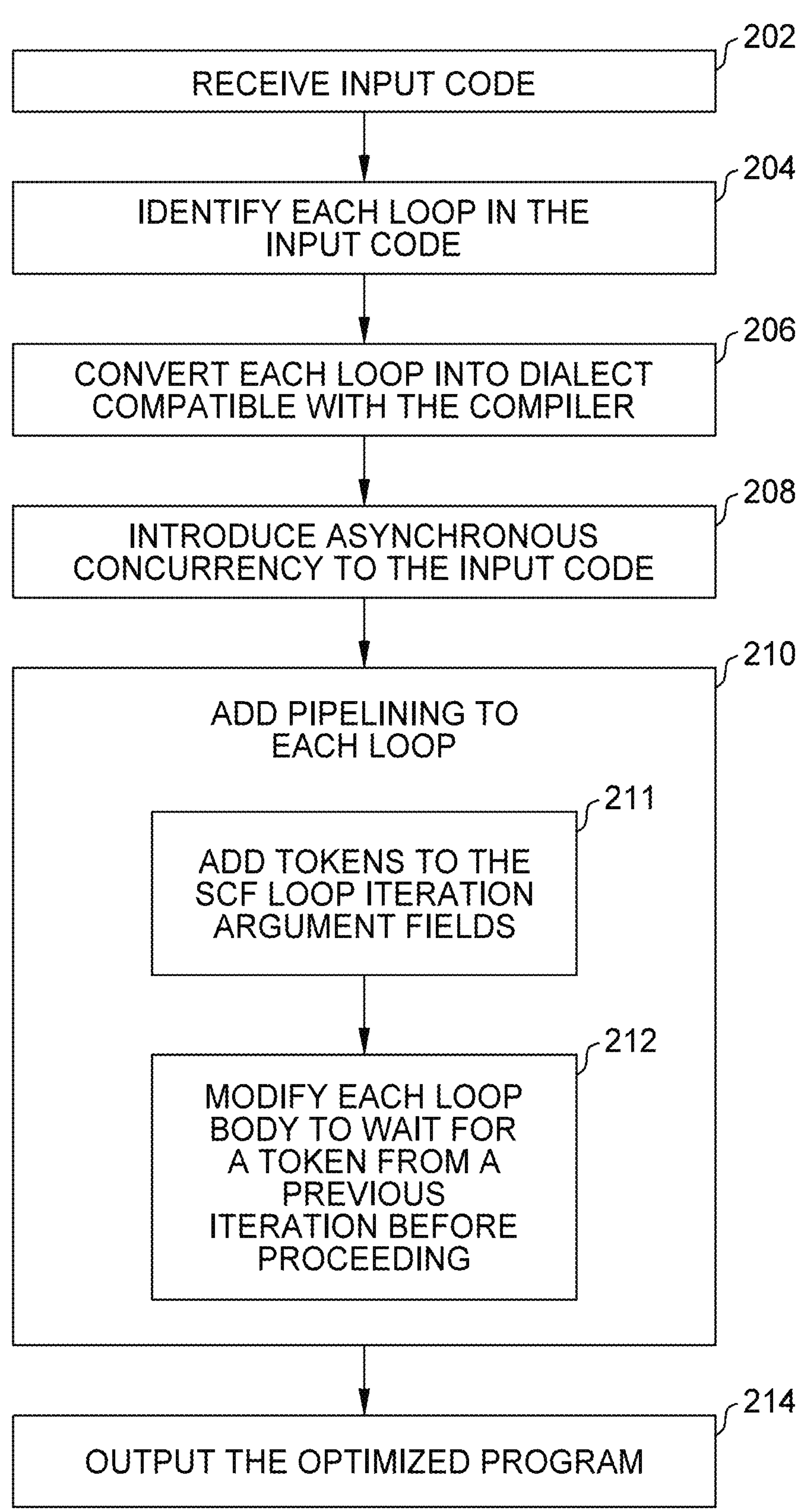
FIG. 2 illustrates a process flow of a method for adding pipelining semantics to a program using passed-in asynchronous tokens.

FIG. 2 illustrates a process flow of a method 200 for adding pipelining semantics to a program using passed-in asynchronous tokens. FIG. 2 is described with reference to FIG. 1.

At block 202 of the method 200, a compiler, such as the compiler 104, receives input code (i.e., a program), such as input code 101 in a first format. In one example, the first format is MLIR format. In one example, the input code 101 includes at least one loop. A loop is a programming element (lines of code) that repeats a portion of the code (i.e., executes operations) a desired number of times until the desired process is complete. For example, as illustrated in FIG. 3A, the compiler 104 receives an input code 300A. The input code 300A is an example of a program that increments all data stored in a block of memory by one (i.e., add_one), with a for loop (i.e., scf.for) in iterative increments. Therefore, the input code 300A includes a loop. Although the input code 300A includes a single loop, this is for example purposes only. The quantity of loops in the input code is not limited.

At block 204 of method 200, the compiler 104 identifies each loop in the input code. In one or more examples, the compiler 104 identifies each loop in the input code by walking through the entire input code and checking if any operation in the input code includes an iteration space (i.e., a loop operation). As noted above, the input code 300A includes one loop. After identifying each loop in the input code, the method 200 proceeds to blocks 206-210. Blocks 206-210 are performed for each loop in the input code.

At block 206 of method 200, the compiler 104 converts the loop(s) into a dialect that is compatible with the compiler 104. For example, if the compiler 104 is an MLIR compiler, the compiler 104 converts the loop(s) into a dialect compatible with MLIR such as SCF dialect. Alternatively, if the loop(s) are already in in a compatible dialect, the compiler 104 can skip block 206.

In one example, the input code 300A includes memory operations memAlloc, add_one, memGpy, and memDealloc that represent memory allocation, "add one", memory copy, and memory deallocation operations, respectively, MemCpy and add_one are loop operations that are performed sequentially and repeated in a loop. For example, memory is allocated for data of a block of memory. Then the input code enters the loop and the data of the block of memory is copied (a first memory copy operation), one is added to the data of the block of memory (an "add one" operation), and then the data of the block or memory is copied (a second memory copy operation), completing an iteration of the loop. This is repeated for a certain number of iterations, and then the memory is deallocated. As illustrated in line 302 of input code 300A, the input code includes an scf.for operation that represents a control flow for a loop. In lines 304-308, the loop iterates between the first memory copy operation in line 304, the "add one" operation in line 306, and the second memory copy operation in line 308 in sequential order for a pre-determined quantity of iterations. The input code 300A requires each loop operation (add_one, and memCpy) in the loop to finish before moving onto the next operation and requires the loop iteration to be completed before restarting the loop.

At block 208 of the method 200, the compiler 104 introduces asynchronous concurrency to each loop in the input code (the program). For example, the compiler 104 introduces asynchronous concurrency to the input code 300A. In one example, the compiler 104 introduces asynchronous concurrency to the input code 300A by updating the input code 300A to include asynchronous tokens that are passed though the loop to add sequentialization and serialization between loop operations and loop iterations. In one or more examples, updating the input code 300A to include asynchronous concurrency allows for a next loop operation to begin before a previous loop operation is completed and allows for more than one thread of code to be executed at a same point in time. This will be described in more detail below.

To improve the efficiency of the program, asynchronous concurrency can be introduced into the input code 300A. First, the compiler 104 evaluates the loop body as a whole and detects any loop carried-dependencies of any data being referenced within the body of the loop. A loop carried-dependency is defined herein as any variable that is used in the loop but is declared above the loop. If any operations in the loop reference a variable declared above the loop, then a loop carried dependency is present. In one example, each operation in the loop that references a variable declared above the loop is deemed as dependent on a loop-carried asynchronous token.

After determining a loop-carried dependency, the compiler 104 transforms the loop by inserting a loop carried asynchronous token (referred to herein as a token) in the SOF loop's iteration argument field (i.e., a loop iteration argument field) as an explicit representation of the loop-carried dependency. For example, as shown in FIG. 38, the compiler updates the input code 300A into an input code 300B by adding a token in the scf.for operation in line 310. The loop operations in input code 300A are updated so that they are executed based on receipt of a token. Additionally, the data dependency being carried out, or across loop iterations, is represented by a yield operation "scf.yield", which yields the loop-carried dependency across loop iterations in line 312 of input code 300B.

For example, in line 310 of input code 300B a token % arg13 is added in the SGF loop iteration argument field (i.e., "iter_args") that represents a loop-carried dependency. Input code 300B causes the token % arg13 to be created at initialization of each iteration of the loop. For example, at initialization of the loop, the SOF loop's iteration argument field generates the token % arg13. As shown in line 314 of the input code 300B, the first memory copy command cannot be executed until the token % arg13 is received from the SCF loop's iteration argument field. Once the first memory copy command receives the token % arg13 from the SCF loop's iteration argument field, the first memory copy command is executed. After completion of the first memory copy command, the token % arg13 is passed to the next loop operation and the "add one" memory command is executed in line 316 of the input code 3008. In line 316 of the input code 300B, the "add one" memory command is not executed until the token % arg13 is received. A token async_token7 is generated and then passed to the next line of code (line 318) after completion of the "add one" operation. In line 318 of the input code 300B, after the "add one" memory command is completed, the token async_token_7 is passed and the second memory copy operation is completed. At the completion of the second memory copy operation in line 318, a token %6 that indicates the second memory copy operation is completed, is generated. The token %6 is passed to the scf.yield operation in line 312 of the input code 3008. In line 312, the token %6 is yielded by the scf.yield operation and is passed back to the next iteration of the loop (i.e. the SCF loop's iteration argument field). The iteration argument in the SCF loop's iteration argument field causes the loop to wait until the token %6 is yielded. Once the token %6 is yielded, the SCF's loop iteration argument field regenerates the token % arg13 and the input code 300B repeats the loop until the desired number of iterations are completed, and the input code 300B exits the loop. Advantageously, the tokens serialize the work done in each iteration of the loop. The tokens also ensure that the loop undergoes the desired number of iterations before the memory deallocation operation. Although the SCF loop's iteration argument field includes one token to cycle through the loop, multiple tokens may be cycled through the loop.

However, introducing asynchronous concurrency to the input code 300A can be a difficult task because understanding the program's reasoning, concurrency opportunities, and the like can be difficult for numerous reasons, such as the input code being complex. Furthermore, it is especially challenging for the compiler 104 to automatically infer any asynchronous concurrency from the program, and optimize its mapping to spatial hardware. To ensure explicit representation of asynchronous concurrency in the program, the input code 300B can be overlaid with an asynchronous control and dataflow graph (CDFG), with dependency edges explicitly annotated inline.

Figures 3C, 3D:
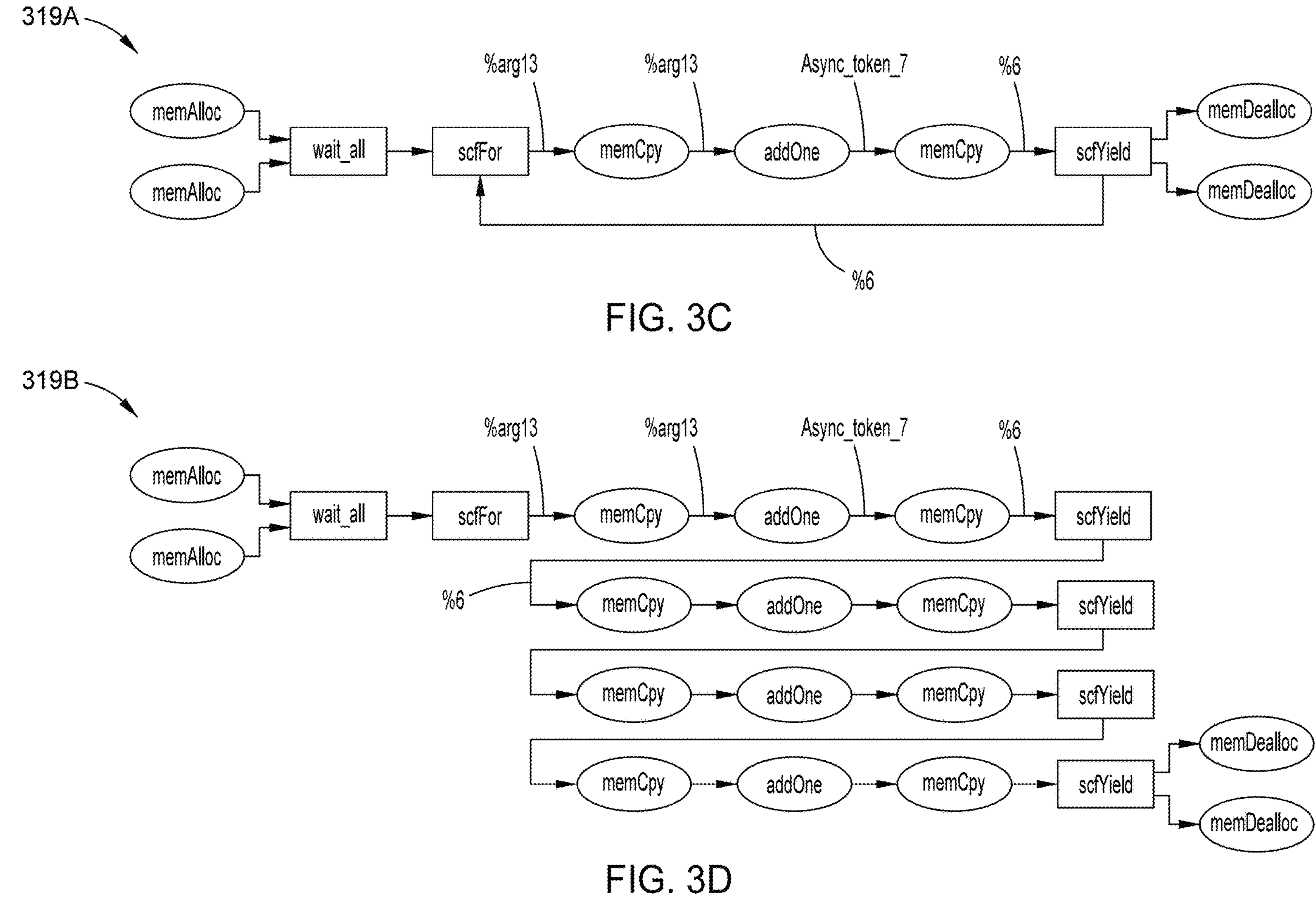
FIG. 3C illustrates a control and dataflow graph (CDFG) of the input code of FIG. 3B according to one or more examples
FIG. 3D illustrates an unrolled CDFG of the input code of FIG. 3B according to one or more examples.

FIG. 3C illustrates a CDFG of the input code of FIG. 3B according to one or more examples. In one example, an asynchronous control and dataflow graph (CDFG) 319A represents the input code 300B. As noted above, CDFG 319A includes dependency edges explicitly annotated inline. The CDFG 319A represents an optimized asynchronous schedule of the input code 300B. As noted above, and illustrated by CDFG 319A, dependency edges connect each of the memory (and loop) operations to one another and couple scf.for and scf.yield. In addition, as shown by CDFG 319A, the two memory allocation operations, memAlloc, can be executed in concurrency if enough memory space is available. As shown in the CDFG 319A the token arg %13 is generated in the scf.for operation and is passed to the first memory copy operation. After the first memory operation, the token arg %13 is passed to the "add one" operation. The "add one" operation is executed, and a token async_token_7 is generated and passed to the second memory copy operation. Upon receipt of the token async_token_7, the second memory copy operation is performed and a token %6 is generated and passed to the scf.yield operation. The scf.yield operation yields the token %6 to the scf.for operation and the loop is repeated.

FIG. 3D illustrates an unrolled CDFG of the input code of FIG. 3B according to one or more examples. In one example, an unrolled CDFG illustrates each iteration of a loop. In one example, a CDFG 319B is a view of CDFG 319A with each loop iteration unrolled. As shown in FIG. 3D, memCpy and add_one are each performed sequentially until the compiler 104 exits the loop. However, as shown by CDFG 3198, the program pattern could be further optimized with pipelining, so long as the hardware platform used by the compiler 104 executes data movement and computes in separate hardware components. For example, many modern hardware accelerators, including GPUs and artificial intelligence engines (AIEs), execute data movement and computes in separate hardware components. However, due to the forced sequentiality in the input code 300B, the loop pipelining opportunity is not being exploited, due to forced sequentialization across for loop iterations as shown in CDFGs 319A and 319B.

At block 210 of the method 200, the compiler 104 adds pipelining to each loop. Adding pipelining to the loop includes blocks 211-212. FIG. 3E illustrates input code including a loop that is pipelined according to one or more examples. In one example, input code 300B (FIG. 38) is pipelined and updated as input code 300C by the compiler 104.

At block 211 of the method 200, the compiler 104 adds tokens to the SCF loop iteration arguments. In one example, the compiler 104 unrolls each loop by a factor of N. N, as defined herein, is an integer equal to the number of pipeline stages. For example, in the input code 300C pipelining the loop allows the data of N blocks of memory to be incremented instead of the data of one block of memory. However, incrementing the data of multiple blocks of memory requires increased coordination between a limited amount of resources to ensure that data (i.e., loop) dependences are satisfied in the correct order.

In one example, N can be user defined. In another example, N is optimized by the compiler 104. The compiler 104 generates N copies of memory blocks and producer and consumer threads. Threads as defined herein are sequences of code to be executed. Producer threads correspond to sequences of code in which data is produced (i.e., provided) to a resource such as a memory (e.g., a buffer). Consumer threads correspond to sequences of code in which data is consumed from a resource. Stated differently, during pipelining the producer thread generates data and provides the data to a resource while the consumer thread consumes data from the resource. The compiler 104 traces through the unrolled loop, collects each copy of the memory blocks along with the producer and consumer threads and generates N+2 loop carrier dependency tokens in the SCF's loop iteration argument field in place of the token % arg13 (i.e., single token) generated in block 208. The tokens are divided into two different groups that each serve two different functions. A first group includes N tokens that represent loop-carried dependencies arising from the reuse of the N memory blocks. A second group includes the remaining two tokens that represent the serialization of each memory block's data producers or consumers across loop iterations.

In one example, and as shown in input code 300C, if N is equal to 2, there are two pipeline stages. Stated differently, the data stored in two different blocks of memory (instead of one block as shown in input codes 300A and 300B) can be iterated in a single loop. However, as noted above, limited resources requires increased coordination between operations is required due to loop dependences.

As shown in line 320 of input code 300C, the SCFs loop iteration argument field in the input code 300C includes 4 (N+2) tokens. As described above N+2 tokens are used so that there are N tokens that are used to represent each of the N memory blocks and two tokens to represent the serialization of each memory block's data producers or consumers across loop iterations. In particular, the SCF's loop iteration argument field generates a four asynchronous tokens (referred to herein as "tokens") % arg13-% arg16. For example, the tokens % arg13 and % arg14 represent the loop-carried dependencies, and the tokens % arg15 and % arg16 correspond to the two tokens that represent the serialization of each memory block's data producers or consumers across loop iterations. The loop body is also modified to include a quantity of sequences (threads) sequences of code (e.g., producer and consumer threads) that are executed concurrently. The quantity of threads that is equal to the quantity of iteration arguments (i.e., N). This will be described in more detail below.

Figure 4:
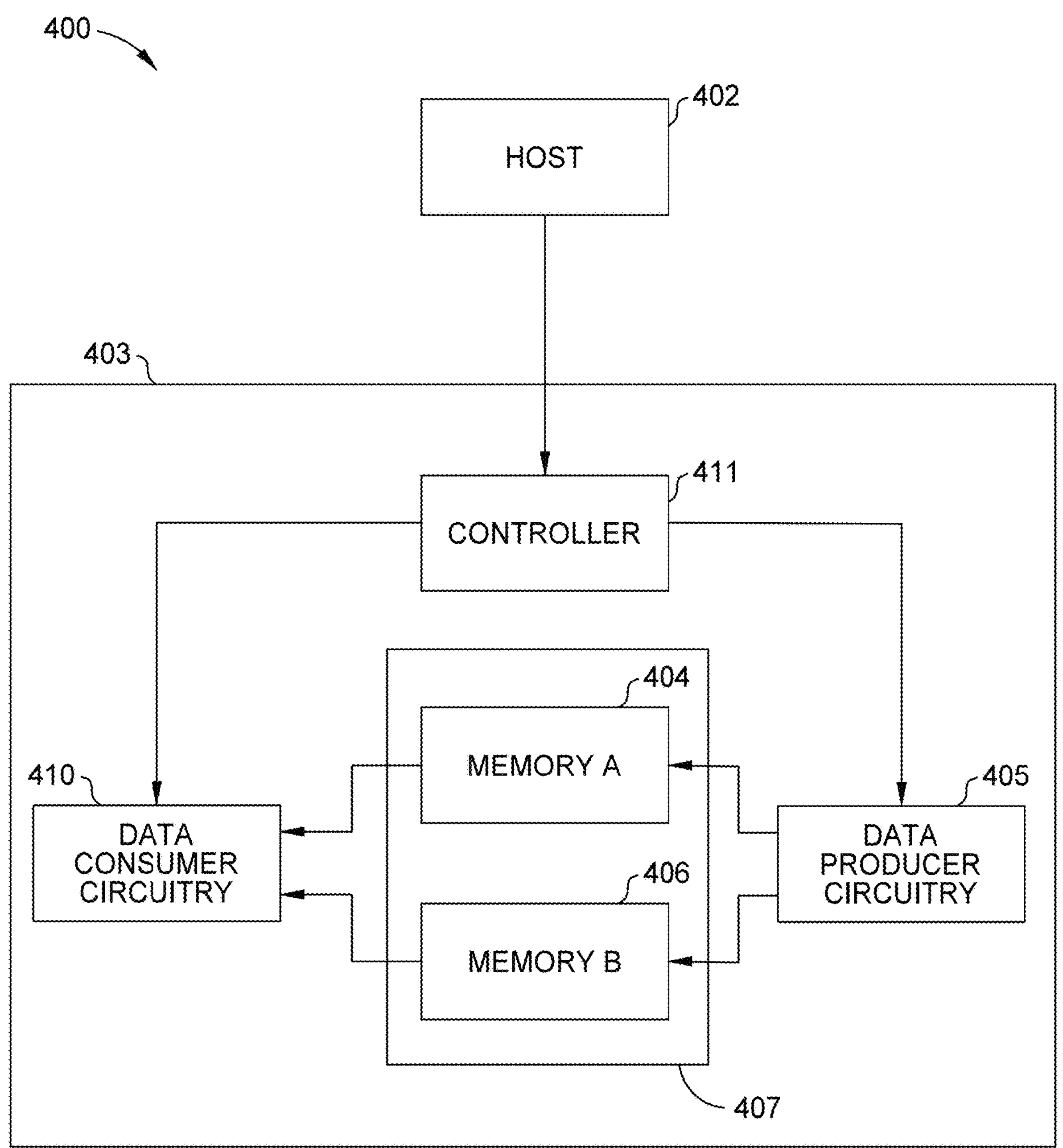
FIG. 4 illustrates an example computing system according to one or more examples.

FIG. 4 illustrates an example computing system 400, according to one or more examples. The computing system 400 is configured to generate and execute pipelined input code. In one example, a host 402 is coupled to an IC device 403. In one example, a memory 407 of the IC device 403 includes a first memory 404 and a second memory 406. The first memory 404 receives data from a data producer circuitry 405 and provides data to a data consumer circuitry 410. The data producer circuitry 405 can provide data to each memory and the data consumer circuitry 410 that can consume data from each memory. Therefore, the program can be pipelined using double buffering (ping-pong) buffering.

In one example, the first memory 404 and the second memory 406 are any type of memory device including, but not limited to read-only memory (ROM), flash memory, dynamic random access memory (DRAM) such as synchronous DRAM (SDRAM), flash memory, static random access memory (SRAM), or the like. In one example, the first memory 404 and the second memory 406 are buffers.

In one example, an output program such as input code 300C is compiled and executed by the controller 411 of the IC device 403. The input code 300C is launched by the host 402 onto the controller 411 which controls and synchronizes both the data producer circuitry 405 and the data consumer circuitry 410 and the access that the data producer circuitry 405 and the data consumer circuitry 410 have to both of the memories according to the pipeline schedule of input code 300C. This will be described in more detail below. Advantageously using the generated tokens, the controller 411 can automatically interpret and leverage the pipelining concurrency in the proper order by tracing through the dependency relationships between operations. Thus allowing the host 402, after launching program (i.e. the input code 300C) to the controller 411, to move on to process and launch other works in asynchronous concurrency with the program.

Although pipelining using two memories, a single data producer circuitry, and a single data consumer circuitry is described herein, this is for example purposes only. The quantity of buffers, producer circuitries, and consumer circuitries is are not limited, and any type of pipelining can be utilized.

Referring back to FIG. 3E, because N is equal to 2 (stages), the input code 300C includes a ping producer thread that corresponds to providing data to the first memory 404 (ping buffer), a pong producer thread that corresponds to providing data to the second memory 406 (pong buffer), a ping consumer thread that corresponds to consuming data from the first memory 404, and a pong consumer thread that corresponds to consuming data from the second memory 406. Stated differently, each producer thread corresponds to input code to be executed by the data producer circuitry 405 and each consumer thread corresponds to input code to be executed by the data consumer circuitry 410. For example, the data producer circuitry 405 performs the first memory copy operation and the data consumer circuitry 410 performs the "add one" and second memory copy operations.

In one example, data of a first block of memory is processed using the ping producer threads and the ping consumer threads. Data of a second block of memory is processed using the pong producer threads and the pong consumer threads. The data producer circuitry 405 is able to perform the first memory copy operation for the data of each memory block (the ping and pong producer threads) and the data consumer circuitry 410 is able to perform the second memory copy operation for the data of each memory block (the ping and pong consumer threads).

In block 212 of method 200, the compiler 104 modifies the body of each loop to wait for to receive at least one specific token before proceeding, as shown in the input code 300C. For example, each operation in the loop body is executed upon receipt of at least one token and a token is generated and/or passed after execution to a next operation in the loop. Advantageously this ensures sequentialization and serialization between operations within the pipelined loops. At the beginning of a loop, due to the sequential order of the memory operations, the loop starts with the first memory copy operation for the data of the first block of memory (or vice versa). In one example, as illustrated in line 322 of input code 3000, the compiler 104 modifies the body of the loop so that the token % arg13 and the token % arg16 are passed to the ping producer thread. Based on the modified input code, the first memory copy operation for the data of the first block of memory is executed when the token % arg13 and the token % arg16 are received by the ping producer. At completion of the first memory copy operation for the data of the first block of memory a token %5 is generated that indicates the first memory copy operation is completed.

Next, the "add one" operation for the data of the first block of memory can be executed. Advantageously, the "add one" operation and the second memory copy operation are executed by the data consumer circuitry 410 and the first memory copy operation is executed by the data producer circuitry 405. Therefore, the first memory copy operation for the data of the second block of memory can be performed concurrently with the "add one" and second memory copy operations for the data of the first block of memory. Therefore, as illustrated in lines 324-326 and line 328 of the input code 3000, the token %5 and the token % arg15 are passed to the ping consumer thread and the token % arg14 and the token %5 are passed to the pong producer thread. In line 324, receipt of the token %5 and the token % arg15 indicate that the first memory copy operation for the data of the first block of memory is complete. Stated differently, the data producer circuitry 405 is finished with the first memory copy operation and is now available. Upon receipt of the token %5 and the token % arg15 by the ping consumer thread, the "add one" operation and second memory copy operations for the data of the first block of memory are executed. Upon completion of the "add one" operation and second memory copy operations for the data of the first block of memory a token %6 and a token % async_token_7 are generated. The token % async_token_7 indicates that the "add one" operation for the data of the first block of memory is complete. The token %6 indicates that the loop operations for the data of the first block of memory is complete. Stated differently, the %6 token indicates that the data consumer circuitry 410 is finished with the "add one" and second memory copy operations for the data of the first block of memory, and is now available. The token %6 is proved to the scf.yield function in line 331 and the token % async_token_7 is provided to the pong consumer thread in line 329.

Concurrently, receipt of the token % arg14 and the token %5 also indicates to the pong producer thread that the first memory copy operation for the data of the first block of memory is complete. Therefore, the data producer circuitry 405 is available to execute the first memory copy operation for the data of the second block of memory. In line 328, upon receipt of the token % arg14 and the token %5, the first memory copy operation for the data of the second block of memory is executed and a token %7 is generated at completion. The token %7 indicates that the first memory copy function for the second block of memory is complete and is passed to the pong consumer in line 329 and the scf.yield operation in line 331.

In lines 329-330 the pong consumer receives the token % async_token_7 and the token %7. This indicates to the pong consumer thread that the loop operations of the data of the first block of memory are complete and that the first memory copy operation for the data of the second block of memory is complete. Stated differently, the data consumer circuitry 410 is now finished with the "add one" and the second memory copy operation for the data of the first block of memory, and is now available. In line 329, upon receipt of the token % async_token_7 and the token %7, the "add one" operation and second memory copy operations for the data of the second block of memory and a token % async_token_8 and a token %9 are generated. The token %9 can serve as an indicator the loop operations for the data of the second block of memory is complete. The token async_token_8 indicates that the "add one" operation for the data of the second block of memory is complete. The token %9 is provided to the scf.yield function in line 331.

Once the scf.yield function in line 331 receives a token, the received token is yielded by the scf.yield operation. Once any of the tokens are received by the scf.yield operation, a next loop iteration can begin. For example, the scf.yield operation is configured to receive the token %6, the token %7, and the two %9 tokens. Each of the tokens received by the scf.yield function are next-loop incarnations of a corresponding token initiated in the inter arguments of the scf.for operation. For example, token %6 is the next loop incarnation of the token % arg13, the first %9 token received is the next loop incarnation of the token % arg14, the second %9 token received is the next loop incarnation of the token % arg15, and the %7 token received is the next loop incarnation of the token % arg16. Advantageously, this allows for a next loop iteration to begin prior to a current loop iteration is completed.

For example, once the scf.yield operation receives (and yields) the token %6 and the token %7, the first memory copy operation in a next iteration for the data of the first block of memory can be performed even if a current loop iteration is still underway. Once the desired number of loop iterations are completed, memory deallocation operations are performed for the data of both blocks of memory.

Figure 3F:
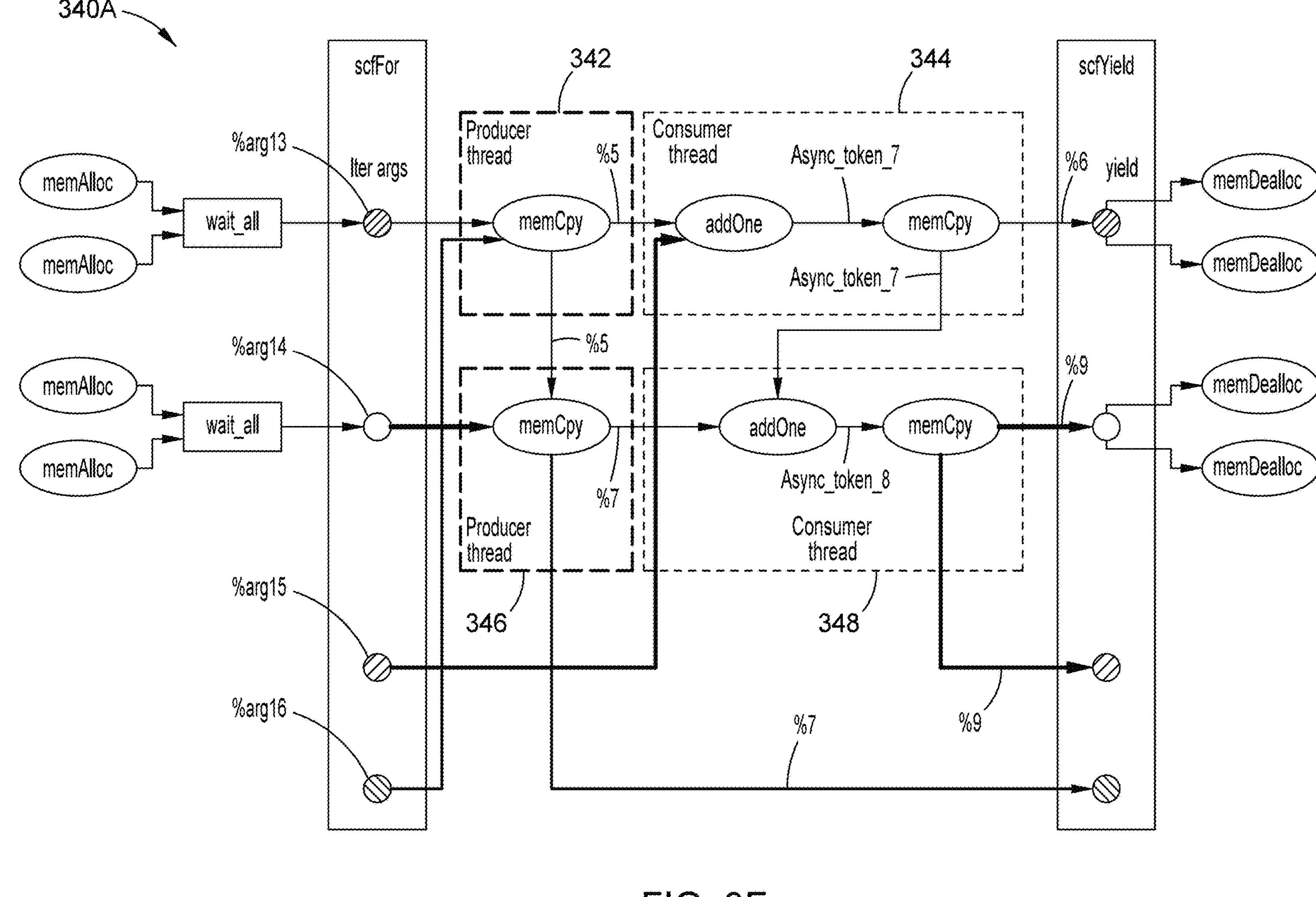
FIG. 3F illustrates a control and dataflow graph (CDFG) of the input code of FIG. 3E according to one or more examples.

FIG. 3F illustrates an asynchronous control and dataflow graph (CDFG) 340A of the input code 300C. As noted above, CDFG 340A includes dependency edges explicitly annotated inline. The CDFG 340A represents an optimized pipeline schedule that is overlaid with the input code 300C to ensure the pipeline scheduling of input code 3000 is optimized.

In CDFG 340A a data producer thread 342 represents a ping producer thread, a data consumer thread 344 represents ping consumer thread, a data producer thread 346 represents a pong producer thread, and a data consumer thread 348 represents a pong consumer thread. As noted above, four tokens % arg13-% arg16 are generated in the SCF loop's iteration argument field in line 320 of the input code 300C (FIG. 3E).

At the beginning of a loop, due to the sequential order of the memory operations, the loop starts by executing the first memory copy operation for the data of the first block of memory. The token % arg13 and the token % arg16 are passed to the data producer thread 342 (line 322 of the input code 300C). Upon receipt of the token % arg13 and the token % arg16, the first memory copy operation for the data of the first block of memory is executed and the token %5 is generated by the data producer thread 342 indicating that the first memory copy operation is completed.

Next, the "add one" operation for the data of the first block of memory can be executed and the first memory copy operation for the data of the second block of memory can be executed concurrently. Therefore, the token %5 and the token % arg15 are passed to the data consumer thread 344 and the token % arg14 and the token %5 are passed to the data producer thread 346. Upon receipt of the token %5 and the token % arg15, by the data consumer thread 344, the "add one" operation and the second memory copy operation for the data of the first block of memory and the token %6 and the token % async_token_7 are generated by the data consumer thread 344. The token % async_token_7 indicates that the "add one" operation for the data of the first block of memory is complete. The token %6 can serve as an indicator the loop operations for the data of the first block of memory is complete.

Concurrently, upon receipt the token % arg14 and the token %5 by the data producer thread 346, the first memory copy operation for the data of the second block of memory is executed and a token %7 is generated. The token %7 indicates that the first memory copy operation for the data of the second block of memory is complete and is passed to the data consumer thread (line 348 of the input code 300C) and the scf.yield operation.

The data consumer thread 348 receives the token % async_token_7 and the token %7. This indicates to the data consumer thread 348 that the loop operations of the data of the first block of memory are complete and that the first memory copy operation for the data of the second block of memory is complete. Upon receipt of the token % async_token_7 and the token %7 by the data consumer thread 348, the "add one" operation and second memory copy operations for the data of the first block of memory are executed the tokens % async_token_8 and %9 are generated. The token async_token_8 indicates that the "add one" operation for the data of the second block of memory is complete. The token %9 can serve as an indicator that the loop operations for the data of the second block of memory are complete. The tenth token %9 is proved to the scf.yield function.

As noted above, the scf.yield operation is configured to receive the token %6, the token %7, and the two %9 tokens. Each of the tokens received by the scf.yield function are next-loop incarnations of a corresponding token initiated in the inter arguments of the scf.for operation. Advantageously, this allows for a next loop iteration to begin prior to a current loop iteration is completed.

Figure 3G:
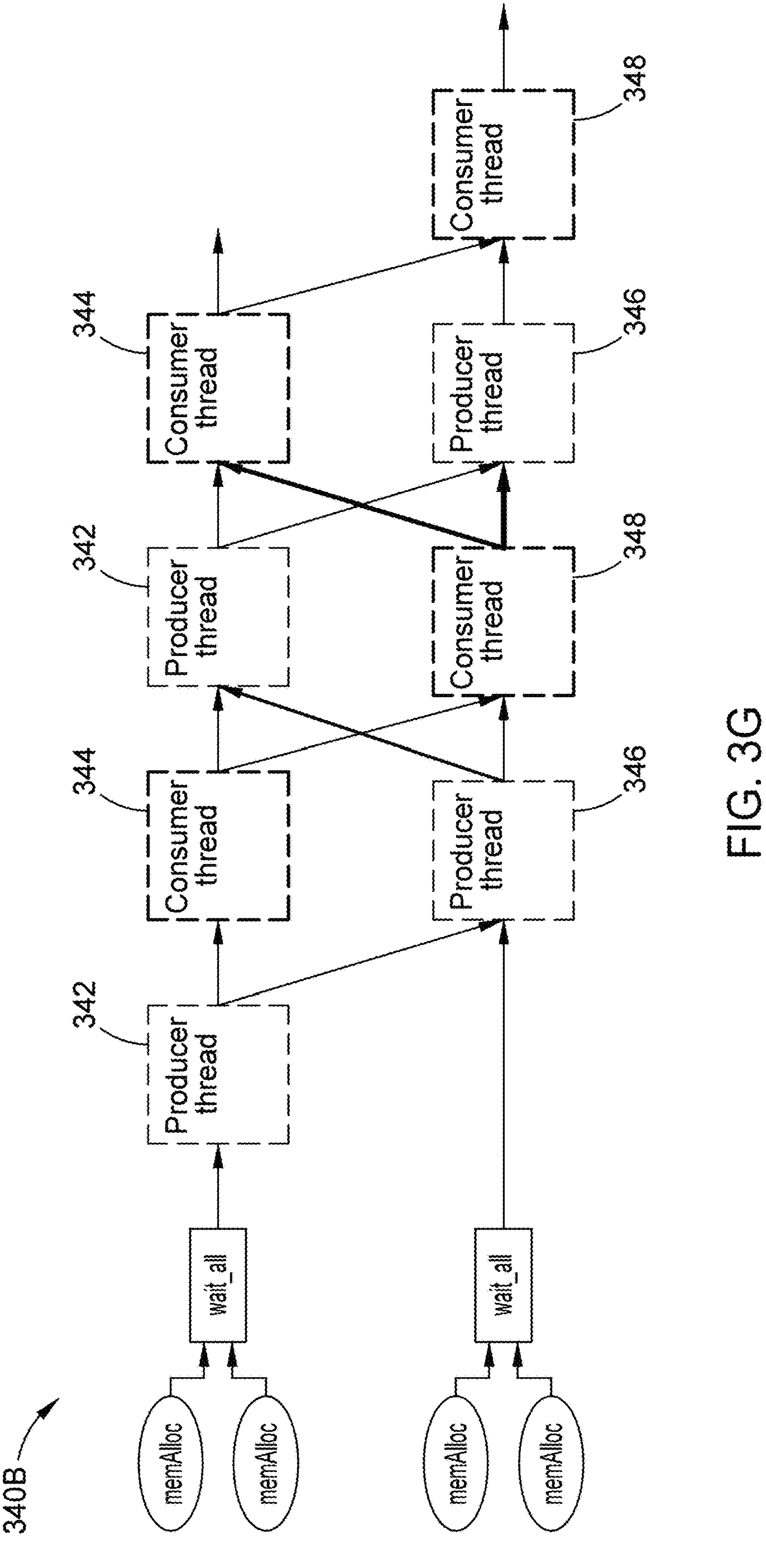
FIG. 3G illustrates an unrolled control and dataflow graph (CDFG) of the input code of FIG. 3E according to one or more examples.

FIG. 3G illustrates an unrolled CDFG of the input code of FIG. 3E according to one or more examples. In one example, a CDFG 340B is a simplified view of CDFG 340A with each loop iteration unrolled. As illustrated in FIG. 3G, based on the receipt of tokens initialized in the SCF's loop iteration argument (tokens % arg13 and % arg16), a loop iteration begins by executing a first memory copy operation (producer thread 342). Next, the "add one" and second memory operations and the first memory copy operation are executed concurrently. The "add one" and second memory operations for the data of the first block of memory are executed when the data consumer thread 344 receives a token from the data producer thread 342 and a token from SCF's loop iteration argument (tokens %5 and % arg15). Concurrently, the first memory copy operation for the data of the second block of memory is executed when the data producer thread 346 receives a token initialized by SCF's loop iteration argument and the token generated by the data producer thread 342 (% arg14 and %5).

The data consumer thread 344 after completing the second memory copy operation generates and provides a token the scf.yield operation (not shown) and provides a token to the data consumer thread 348 (token async_token_7). The producer thread, at the completion of the first memory copy operation for the data of the second block of memory, generates and provides a token (%7) to both the scf.yield operation (not shown) and the data consumer thread 348. Once the data consumer thread 348 receives the tokens from both the data producer thread 346 and the data consumer thread 344, the "add one" and second read operations for the data of the second block of memory are executed. Once the "add one" and second read operations for the data of the second block of memory are completed the consumer thread generates and provides a token (%9) to the scf.yield operation (not shown). Each the tokens received by the scf.yield operation are yielded to the scf.for operation, and the loop is repeated until the desired quantity of iterations is reached.

At block 214, the host 102 outputs the pipelined input code (program). For example, the host 402 outputs the input code 300C to the IC device 403. In one example, the input code is output in MLIR format. In another example the input code 3000 is provided from the host 402 to the controller 411 as a CDFG, such as CDFG 340A (FIG. 3F). Advantageously, this allows the controller 411 to automatically interpret and implement the correctly pipelined schedule by traversing through the dependency edges, without requiring any prior knowledge of interpreting and reasoning about pipelining.

What is claimed is:

1. A method comprising:

receiving, by a compiler of a host of a computing system, input code;

generating, by the compiler, pipelined input code by adding first tokens in a loop iteration argument field of a loop in the input code to pipeline the loop, the first tokens configured to sequentialize and serialize loop operations, wherein a quantity of the first tokens is N+2, wherein N is based on a quantity of pipeline stages; and providing, by the host, the pipelined input code to a controller of an integrated circuit (IC) of the computing system.

2. The method of claim 1, further comprising:

generating, by the compiler, asynchronous input code prior to generating the pipelined input code by adding second tokens to the loop iteration argument field, the second tokens configured to be passed sequentially through operations of the loop to provide asynchronous concurrency; and generating the pipelined input code by replacing the second tokens with the first tokens in the loop iteration argument field.

3. The method of claim 2, wherein generating the asynchronous input code comprises inserting the second tokens in the loop iteration argument field based on loop-carried dependencies in the loop.

4. The method of claim 1, wherein generating the pipelined input code comprises modifying a body of the loop so that execution of each loop operation is dependent on receipt of at least one of the first tokens.

5. The method of claim 1, wherein generating the pipelined input code comprises unrolling the loop into N memory blocks, wherein N is an integer equal to the quantity of the pipeline stages.

6. The method of claim 5, wherein generating the pipelined input code further comprises generating a producer thread and a consumer thread for each of the pipeline stages.

7. The method of claim 1, further comprising:

generating, by the compiler, a control and dataflow graph (CDFG) representing the pipelined input code, the CDFG including dependency edges that connect loop operations to one another, and wherein providing, by the host, the pipelined input code to the controller of the IC of the computing system comprises the host providing the CDFG to the controller.

8. A computer system comprising:

a memory comprising instructions; and a processor coupled to the memory and configured to execute the instructions, the instructions when executed cause the processor to:

receive input code; and generate pipelined input code by adding first tokens in a loop iteration argument field of a loop in the input code to pipeline the loop, the first tokens configured to sequentialize and serialize loop operations, wherein a quantity of the first tokens is N+2, and wherein N is based on a quantity of pipeline stages.

9. The computer system of claim 8, wherein the processor is further caused to:

generate asynchronous input code prior to generating the pipelined input code by adding second tokens to the loop iteration argument field, the second tokens configured to be passed sequentially through operations of the loop to provide asynchronous concurrency; and generate the pipelined input code by replacing the second tokens with the first tokens in the loop iteration argument field.

10. The computer system of claim 9, wherein generating the asynchronous input code comprises inserting the second tokens in the loop iteration argument field based on loop-carried dependencies in the loop.

11. The computer system of claim 8, wherein generating the pipelined input code comprises modifying a body of the loop so that execution of each loop operation is dependent on receipt of at least one of the first tokens.

12. The computer system of claim 8, wherein generating the pipelined input code comprises unrolling the loop into N memory blocks, wherein N is an integer equal to the quantity of the pipeline stages.

13. The computer of claim 12, wherein generating the pipelined input code further comprises generating a producer thread and a consumer thread for each of the pipeline stages.

14. An integrated circuit (IC) comprising:

a controller configured to receive pipelined input code from a host including a compiler to:

receive input code; and generate the pipelined input code by adding first tokens in a loop iteration argument field of a loop in the input code to pipeline the loop, the first tokens configured to sequentialize and serialize loop operations, wherein a quantity of the first tokens is N+2, wherein N is based on a quantity of pipeline stages.

15. The IC of claim 14, wherein the compiler is to:

generate asynchronous input code prior to generating the pipelined input code by adding second tokens to the loop iteration argument field, the second tokens configured to be passed sequentially through operations of the loop to provide asynchronous concurrency; and generate the pipelined input code by replacing the second tokens with the first tokens in the loop iteration argument field.

16. The IC of claim 15, wherein generating the asynchronous input code comprises inserting second tokens in the loop iteration argument field based on loop-carried dependencies in the loop.

17. The IC of claim 14, wherein generating the pipelined input code comprises modifying a body of the loop so that execution of each loop operation is dependent on receipt of at least one of the first tokens.

18. The IC of claim 14, wherein generating the pipelined input code comprises unrolling the loop into N memory blocks, wherein N is an integer equal to the quantity of the pipeline stages.

* * * * *